June 17, 1930. G. F. HODKINSON 1,763,784
WATER SOFTENER FOR BASE EXCHANGING SUBSTANCES
Original Filed April 6, 1922 2 Sheets-Sheet 1
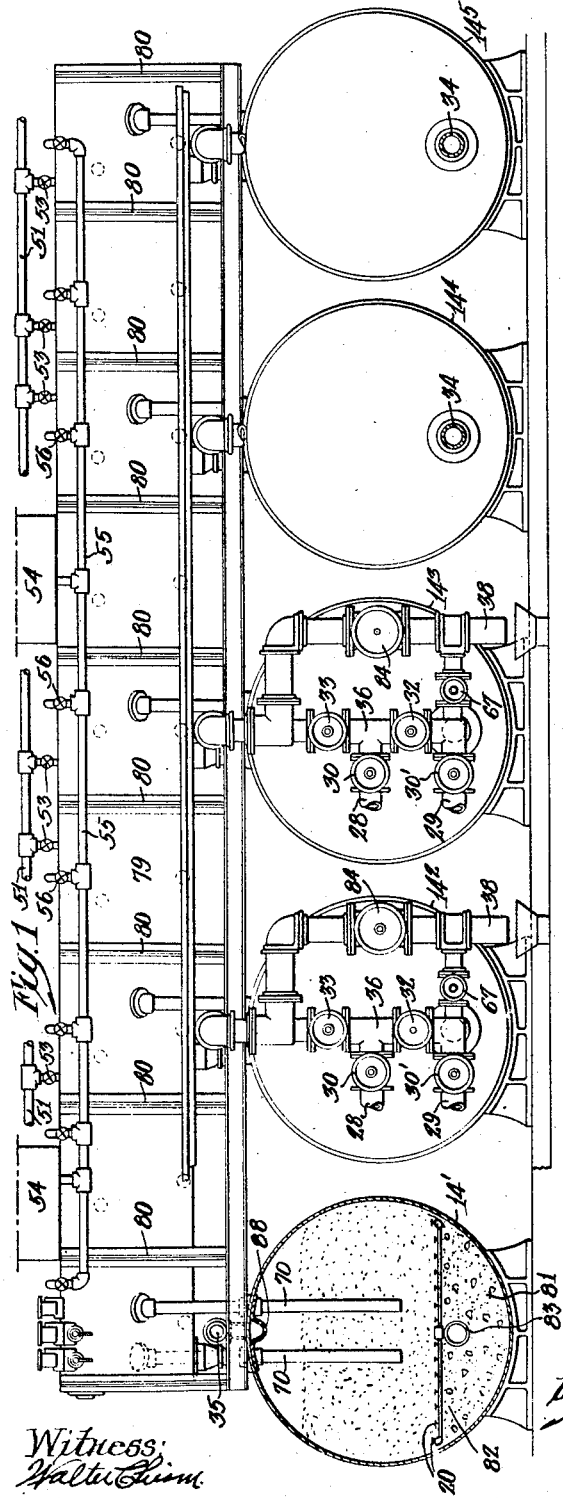
Inventor
George F. Hodkinson
by
Attorney June 17, 1930.  G. F. HODKINSON  1,763,784
WATER SOFTENER FOR BASE EXCHANGING SUBSTANCES
Original Filed April 6, 1922  2 Sheets-Sheet 2
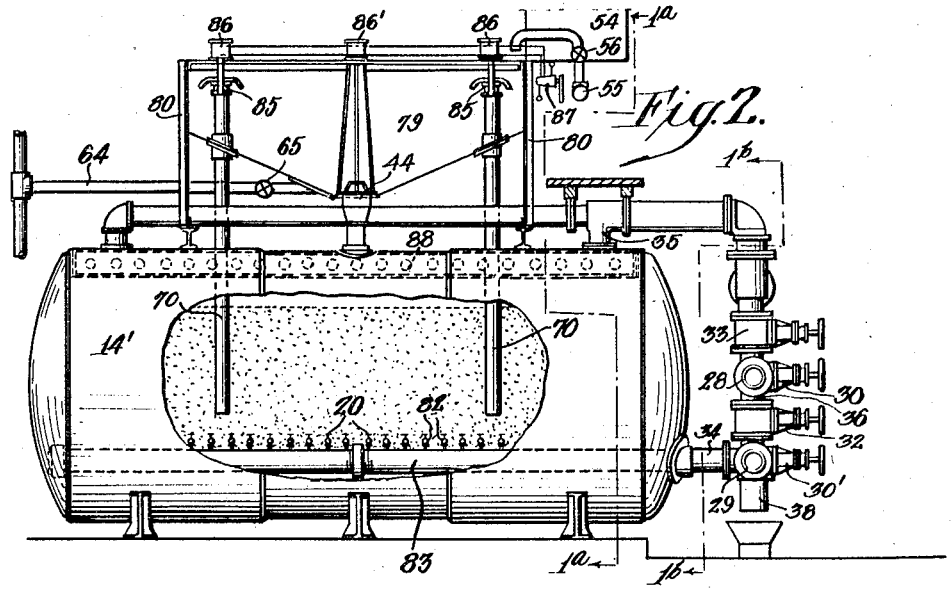
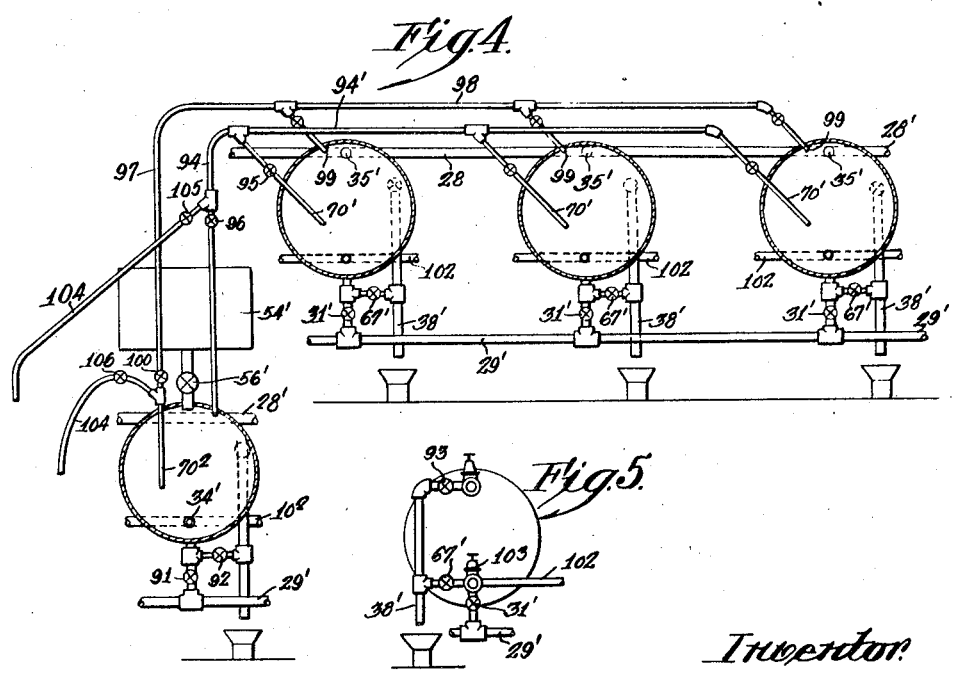

Patented June 17, 1930

1,763,784

UNITED STATES PATENT OFFICE

GEORGE F. HODKINSON, OF BLUE BELL, NEAR AMBLER, PENNSYLVANIA, ASSIGNOR TO THE PERMUTIT COMPANY, OF NEW YORK, N. Y., A CORPORATION OF DELAWARE

WATER SOFTENER FOR BASE-EXCHANGING SUBSTANCES

Original appliation filed April 6, 1922, Serial No. 550,130. Divided and this appliation filed November 10, 1928. Serial No. 318,364.

This invention relates to water softeners; and it comprises a method of operating water softening plants with a minimum of delay wherein a charge of zeolite after serving to soften a sufficient quantity of hard water is removed from the softening apparatus and immediately replaced by a clean regenerated charge, the removed charge of zeolites being sent elsewhere for cleansing and regenerating; and it further comprises as an assemblage of apparatus elements useful in the performance of said method, a plurality of water softening devices, each provided with hard water inlet and soft water outlet and a regenerating device provided with inlet and outlet for removing water and brine inlet, hydraulic means being provided for transferring successive charges of exhausted zeolites and of cleaned regenerated zeolites back to the softening devices; all as more fully hereinafter set forth and as claimed.

In the operation of the ordinary type of softeners using zeolites, the softening operation is interrupted from time to time to permit the zeolites being washed and then regenerated with salt solution and rinsed. This is done in the chamber used for softening. To obtain continuous softening, it is necessary to use several pieces of apparatus working in parallel but out of phase.

In the present invention a plurality of softening devices are assembled with a single regenerating device. By so doing the loss of time in operation of the softener is reduced to that necessary for discharging and recharging the zeolites. Movement of the zeolites in the present invention is effected by quick operating hydraulic means; movements in this manner incidentally giving a thorough cleansing and scouring action.

This application is a division of my application No. 550,130, filed April 5, 1922, for zeolite water softener.

Figure 1 is an end elevation of one form of my invention with portions in vertical sections upon lines 1ª—1ª and 1ᵇ—1ᵇ of Figure 2.

Figure 2 is a side elevation, partly in section, of the structure shown in Figure 1.

Figures 3 and 4 are sectional and elevations intended to be largely diagrammatic, showing other applications of my invention.

Figure 5 is an end elevation showing the connection for one of the tanks of Figure 4.

In the drawings similar numerals indicate like parts.

Base-exchanging substances, to which the term "zeolites" has been loosely applied as a generic term, have been used to a considerable extent in the softening of water and this use has constituted so large a part of their utility that the liquid to be treated by the substance will be referred to herein generically as water.

In the use of such a softener in the older art the bed is placed within a tank which is closed so as to permit the water to pass through the bed at the normal water pressure. During the water softening run the material of necessity screens or filters out such foreign solid matter as the water may contain but its primary function is to act chemically to exchange bases with chemicals in the water, such, for example as calcium carbonate, substituting the calcium-oxide of the carbonate for the sodium-oxide of the zeolite and the sodium-oxide of the zeolite for the calcium-oxide of the carbonate, so that the new compound formed in the water is not a hardening constituent. The bed is then back-washed to remove the mechanical impurities and is regenerated by the passage through it of a solution such as common salt, with subsequent washing to remove the excess salt. The "zeolite" is then ready for another run.

While back-washing has the effect of partially loosening up the bed of zeolites it does not thoroughly break up material which is matted and this matted material, when it has settled back, resists water flow through it and promotes channeling. Back-washing removes loosely lodged foreign matter but does not cleanse the bed sufficiently preparatory to regeneration and much of the foreign matter adheres to the base-exchanging substance, coating the grains in such a way as to prevent access of the regenerating chemical to the coated portions of the grains, retarding and preventing proper regeneration and subsequent use. The frequency of channeling and coating have contributed to the considerable loss in efficiency of a base-exchanging substance which has been regenerated.

I provide not only for a much more complete intermixing of the grains preparatory to regeneration but for scouring the grains and secure much more thorough cleansing, with or without "back washing", by forcing the material after use in softening water in a suitable chamber into a separate compartment, preferably an open compartment, where it falls into a body of rinse water, and the foreign matter freed from the grains by the stirring up and scouring passes off with the overflow of this water. I also secure the considerable advantage in performing this operation as well as regeneration in a tank open to inspection and giving free access to the material.

I find that the hydraulic handling of the material in its transfer to the separate regenerating tank is more efficient in restoration of the grains to their original condition and efficiency than is the usual back-washing.

Taking up first the structure of Figures 1 and 2, and describing it in illustration and not in limitation:—

A number of parallel horizontal drums are shown at $14'$, $14^2$, $14^3$, $14^4$, $14^5$, forming softener chambers which receive the base-exchanging substance and hold it during the normal water softening runs. These chambers may be called zones. The drums are surmounted by a transversely extending regenerating casing or box 79 provided with guide-ways 80 within which partitions may be placed to partition off as much or as little of the box as may be desired, and at any point where it may most conveniently act as a regenerating chamber for the charge coming from any one of the softener drums $14'$—$14^5$. Of course the compartment will usually be selected with a view to bringing it as immediately as possible over the softener drum whose granular content is to be regenerated.

The bottoms of the softener drums are concreted at 81 and, during the passage of water through the drum in either direction, the strainers 20 deliver their water to or from laterals 82 connected with the main 83.

Water inlet may take place through either of pipes 28 or 29, the other being the outlet. These are controlled by valves 30, 30', 33 and the by-pass 36 is controlled by valve 32. The connections between the water supply 51 and the regenerating tanks are controlled by valves 53 and the connection between water pipe 29 and the waste water pipe 38 is protected by valve 67. The valve 84 is adapted to close the waste outlet.

On account of the length of the drums as ordinarily installed two pipes 70 are used for each drum leading from the softener drum to the regenerating box or casing and these are staggered to enter the casing on opposite sides of the casing as well as to different positions laterally within the drums. They are shown as terminating within the box or casing in valve heads 85 and these valves, as well as the valves 44, are controlled by means of hydraulic cylinders 86, 86' and any suitable valve mechanism therefor at 87.

Inlet water and wastage for the regenerating compartments formed are provided by pipes 51, 38 and 64, the latter being controlled by valve 65.

Salt solution is provided from a tank 54 through a pipe 55 and connections controlled by valves 56.

A regenerator chamber of any desired size may be provided for regeneration, this chamber being located above any of the softener drums. The softening operation may be performed in this form of apparatus by passing the water from the influent 28, for example, through the pipes 35 from which it will be distributed through perforated trough 88 and out through pipe 34 and effluent 29. Back-washing may be accomplished through water from the influent 28 passing through the by-pass into the softener through pipe 34 and out through the waste connections 38.

When regeneration is desired the pipes 28, 29, 38 are closed and water is passed into the bottom of the appropriate softener drum through valve 32 and pipes 34 and 83 and strainers 20, forcing the base-exchanging substance up through pipes 70 and into the appropriate section of the length of tank 79, where it is discharged into a body of rinse water previously provided in the regenerating tank. It is then regenerated in its new position by salt solution from tank 54. The salt solution is then washed out by passing water through it and the valve 44 is opened to discharge the regenerated content into rinse water in the softener drum from which it has come, making it ready for another run.

Back-washing may be resorted to to assist leveling the bed whenever the distance from the valve or valves 44 to the farthest removed part of the softener tank is great enough for appreciable difference in thickness of bed to be noticed.

In this, as in the other forms shown, softening may be in either direction, regeneration and washing may be in either direction, and the regeneration may take place by discharging of the base-exchanging substance into a salt solution instead of by application of the salt solution to the bed in the regenerating chamber.

In Figure 3 I have shown diagrammatically another arrangement of the softening zones. Two groups of softener drums, $14^6$ and $14^7$ respectively, on opposite sides of a regenerating tank 90, are so located and connected that the base-exchanging content from any of the softening drums may be thrown hydraulically into the regenerating tank, here shown as on a level with and of the same character as the drums.

The conditions of transfer are such that this regenerating tank may be either above or below the level of the water softeners and placing it in the middle of the set is a convenience to make it easily accessible.

Inlet water for the drums and regenerating tank is supplied by inlet 28' with outlet from all of the drums and from the tank at 29', the immediate connections being shown at 35', 34' respectively. Waste water connection is made through pipes 38', and valves 31', 67' and 39' are shown as controlling the outlet, its connection to the waste pipe, and the waste pipe, respectively, as to all of the softener drums. Valves 91, 92, and 93 perform similar functions in the regenerating tank.

For the transfer of the base-exchanging material hydraulically from any of the softener drums to the regenerating zones or tank I provide pipes 70' preferably having long radius connections with the connecting pipes 94. These pipes terminate at the shell of the regenerating tank and can be cut off from the drums and from the regenerating tank by valves 95 and 96.

A corresponding system is applied to the return of the zeolite and pipes 70² and 70³ are provided within the regenerating tank, connected preferably also by long radius connections with distributing pipes 97 and 98, having branches terminating at 99 at the shells of the respective drums 14⁶ or 14⁷. Valves 100, 101 close these pipes as desired.

By this construction, after a run has been made in the softener drums, by passage of water through from pipe 28', for example, to pipe 29', suitable connections are made and inlet water is supplied to force the base-exchanging material through the pipes from any one of the softener drums at a time to the regenerating tank. Likewise when regeneration and washing have taken place, the application of water pressure to the regenerating tank forces its regenerated content out through pipe 70² or 70³ into the appropriate drum. All of the valves in the several pipes 70', 70², 70³, the longitudinally extending pipes 94, 94', 97, 98 and the several inlet pipes or branches therefrom terminating at the shells of the drums and regenerating tank are kept closed except the valves in the pipes which are being used at the time. Care must be taken to place the valves close enough to the transfer pipes to prevent danger of stoppage by excessive filling of space above the valves with the base-exchanging material.

As this view is merely diagrammatic, it has not been considered necessary to show the connections for more than the simplest operation of the system but any of the connections can be applied to it that are applied to the other forms for permitting various operations of softening, regenerating and washing to be performed in either direction. For back-washing and transferring the material by raw water, pipe 102 is supplied, the individual connections being controlled by valves 103.

It will be noted here that a single regenerating tank only is required, fed from salt tank 54', past valve 56'; that it may be of the same character as the softening drums used and on the same level therewith and that identical methods and mechanism may be used for transferring the substance or material from the drums to the regenerating tank and for returning the material from the latter to the softening drums, the drums being operated in overlapping phase, that is, softening being performed simultaneously in several drums with periodical transfer of base-exchange substance from one drum at a time to the regenerating tank.

It will be noted moreover that in all of the methods described the softening drum is available for cleaning or repairs during the regenerating operation and that in the form shown in Figure 3, if the number of charges of material be less than the number of softening drums, one or more or the latter, selectively may be taken out of service for any repairs or attention required, transferring its content for regeneration and retransferring it from the regenerating tank to a different drum. Of course the drums described are in fact tanks whose shape is of little consequence so far as their suitability for the practice of my invention.

In Figure 4 the construction shown corresponds with that in a portion of Figure 3, in the provision of a plurality of softening zones or drums and a regenerating zone or tank, with piping connections for hydraulically transferring the base-exchanging substance from the drums to the regenerating tank and back again; but with the main intended change that the regenerating tank is located below the level of the drums. With the hydraulic transfer of the content, the level or relative position of the parts, within reasonable limits, makes no difference.

By providing discharge pipe 104, Figure 4, connected with the pipes 94, 94', 97, 98 or intermediate connections therefrom (Figures 3 and 4) I am able to discharge the contents of any of the drums or of the regenerating tank to a suitable place of storage or collection with or without previous cleaning or regeneration of the content. These discharge pipes are provided with valves at 105, 106, so as to close them when not in use.

It will be obvious that in view of my disclosure various forms of my invention will be suggested to others skilled in the art, depending upon their experience, whim or need, and it is my purpose to include herein all such as come within the reasonable spirit and scope of my invention.

Having thus described my invention, what I claim as new and desire to secure by Letters Patent is:—

1. The process of handling base-exchanging substances in a water softener system which consists in hydraulically transferring the substances from different softeners operating in overlapping phase one at a time to a common regenerating tank, regenerating the substances in said tank and hydraulically retransferring the regenerated substances from the regenerating tank to the same or a different softener for subsequent use.

2. The process of handling base-exchanging substance in a water softener system, which consists in transferring the base-exchanging-substance from a water softening tank to a separate regenerating tank by hydraulic means and there regenerating it, and in subsequently discharging the substance hydraulically to a point of convenient storage or collection.

3. The process of handling base-exchange-substance in a water softener system, which consists in transferring the base-exchange substance hydraulically from the tank in which it is located to a separate tank and at the same time scouring it and cleansing it by there discharging it into a body of rinse water and in discharging the cleansed and rinsed base-exchanging substance from the second tank hydraulically to a point of convenient storage or collection.

4. A base-exchange-substance softener tank and connections, in combination with an outside regenerating tank, connections for regenerating the substance, and hydraulic means for transferring the substance from the softener tank to the regenerating tank and separate hydraulic means for transferring the substance directly back from the regenerating tank to the softener tank.

5. A regenerative tank, a softener tank upon either side thereof, and hydraulic means for shifting base-exchanging substance back and forth between the regenerative tank and each softener tank.

6. A regenerative tank, a plurality of softener tanks upon either side thereof, and hydraulic means for shifting base-exchanging substance back and forth between said softener tank and the regenerative tank.

7. A plurality of base-exchanging-substance water softening tanks having water inlet, outlet and waste connections, in combination with a common outside regenerating tank for regenerating the substance from any of the water softening tanks, such tanks having inlet, outlet and waste water connections and regenerating solution connection and hydraulic means for transferring the substance between any of the water softening tanks and the regenerating tank in either direction.

8. In a base-exchanging water softener system, a regenerating tank, a water softener tank on each side thereof, pipes entering the regenerating tank and terminating in the water softening tanks respectively, pipes entering the water softening tanks respectively, and terminating in the regenerating tank, means for applying water under pressure for water softening flow and selectively to any of the three tanks to transfer the content from regenerating tank to either of the water softening tanks or from either of the water softening tanks to the regenerating tanks and regenerating connections for passing regenerating fluid through the material in the regenerating tank.

9. In the methodical utilization of zeolites for softening water, the process which comprises establishing and maintaining a plurality of charges of zeolite operating in parallel in softening water but out of phase and another charge undergoing regeneration, and from time to time substituting a regenerated charge for an exhausted charge and vice versa.

10. In a water softening plant the combination of a plurality of water softening tanks provided with the necessary valves and equipment, and a single regenerating tank with means whereby exhausted zeolite from a softening tank can be transferred to the regenerating tank and regenerated zeolite therefrom to any softening tank.

11. In the methodical utilization of zeolites for softening water the process which comprises establishing and maintaining a plurality of charges of zeolite, each being successively used in softening water, being washed, regenerated and washed with one such charge always in use in softening, there being at any given time one charge in use in softening, another undergoing regeneration and a third regenerated charge ready to replace the softening charge upon exhaustion thereof.

GEORGE F. HODKINSON.